(12) United States Patent
Sidi

(10) Patent No.: US 8,438,646 B2
(45) Date of Patent: May 7, 2013

(54) SYSTEM AND/OR METHOD FOR DISTRIBUTING MEDIA CONTENT

(75) Inventor: Ariff Sidi, Studio City, CA (US)

(73) Assignee: Disney Enterprises, Inc., Burbank, CA (US)

(*) Notice: Subject to any disclaimer, the term of this patent is extended or adjusted under 35 U.S.C. 154(b) by 1390 days.

(21) Appl. No.: 11/413,274

(22) Filed: Apr. 28, 2006

(65) Prior Publication Data

US 2007/0266399 A1   Nov. 15, 2007

(51) Int. Cl.
*H04N 5/445*   (2006.01)
*H04L 29/06*   (2006.01)

(52) U.S. Cl.
USPC ............... 726/26; 725/31; 725/42; 705/57

(58) Field of Classification Search .......... None
See application file for complete search history.

(56) References Cited

U.S. PATENT DOCUMENTS

| | | | |
|---|---|---|---|
| 6,988,277 B2 | 1/2006 | Kovac | |
| 7,146,631 B1 | 12/2006 | Tanaka | |
| 7,188,085 B2* | 3/2007 | Pelletier | 705/50 |
| 7,562,397 B1* | 7/2009 | Mithal et al. | 726/33 |
| 8,165,916 B2* | 4/2012 | Hoffberg et al. | 705/14.53 |
| 2001/0056573 A1 | 12/2001 | Kovac | |
| 2002/0016919 A1* | 2/2002 | Sims, III | 713/193 |
| 2002/0184629 A1* | 12/2002 | Sie et al. | 725/41 |
| 2002/0188570 A1 | 12/2002 | Holliman | |
| 2003/0110130 A1* | 6/2003 | Pelletier | 705/50 |
| 2003/0120541 A1* | 6/2003 | Siann et al. | 705/14 |
| 2003/0146927 A1 | 8/2003 | Crow et al. | |
| 2004/0030599 A1* | 2/2004 | Sie et al. | 705/14 |
| 2004/0073915 A1* | 4/2004 | Dureau | 725/9 |
| 2004/0117248 A1* | 6/2004 | Dutta et al. | 705/14 |
| 2004/0193488 A1* | 9/2004 | Khoo et al. | 705/14 |
| 2005/0033700 A1* | 2/2005 | Vogler et al. | 705/57 |
| 2005/0097599 A1 | 5/2005 | Plotnick et al. | |
| 2006/0039565 A1* | 2/2006 | Kim et al. | 380/277 |
| 2006/0080167 A1* | 4/2006 | Chen et al. | 705/14 |
| 2006/0150216 A1* | 7/2006 | Herz et al. | 725/50 |
| 2006/0161952 A1* | 7/2006 | Herz et al. | 725/46 |
| 2006/0235802 A1* | 10/2006 | Cappio et al. | 705/59 |
| 2006/0277569 A1* | 12/2006 | Smith | 725/35 |
| 2007/0098165 A1* | 5/2007 | Yoshikawa | 380/211 |
| 2009/0076907 A1* | 3/2009 | Litwin et al. | 705/14 |
| 2011/0093879 A1* | 4/2011 | Salkind et al. | 725/23 |

FOREIGN PATENT DOCUMENTS

| | | |
|---|---|---|
| GB | 2416881 | 2/2006 |
| JP | 2001-204005 | 7/2001 |
| JP | 2002-352137 | 12/2002 |

OTHER PUBLICATIONS

U.S. Appl. No. 11/742,466, filed Apr. 30, 2007, 77 pages.
International Search Report for App. Ser. No. PCT/US07/67015 mailed on Mar. 27, 2008.

(Continued)

*Primary Examiner* — Philip Chea
*Assistant Examiner* — Dorianne Alvarado David
(74) *Attorney, Agent, or Firm* — Farjami & Farjami LLP

(57) ABSTRACT

There are provided methods and systems for providing a plurality of protected segments from a contiguous media content segment, and selectively providing a user access to at least a portion of one of the protected segments in response to accessing a gating media segment associated with the protected segment.

71 Claims, 6 Drawing Sheets

OTHER PUBLICATIONS

Press Release: Ultramercial Announces ViewPass, it's Video-on-Demand Advertising Solution, Feb. 23, 2006, 2000-2007 Ultramercial, LLC, http://www.ultramercial.com/press_release_feb06.html.

Ultramercial Video on Demand Model, http://www.ultramercial.com/_campaigns/ultramercial_viewpass/index.html.

* cited by examiner

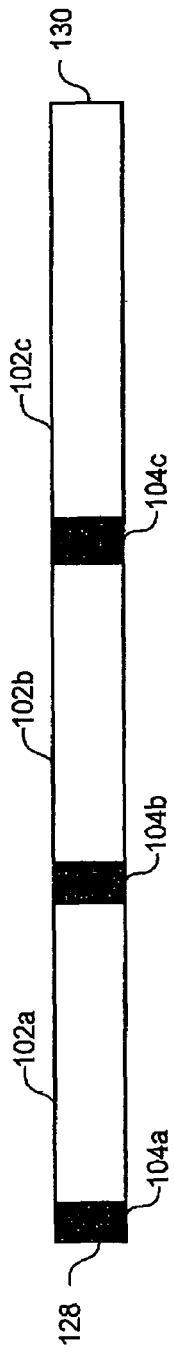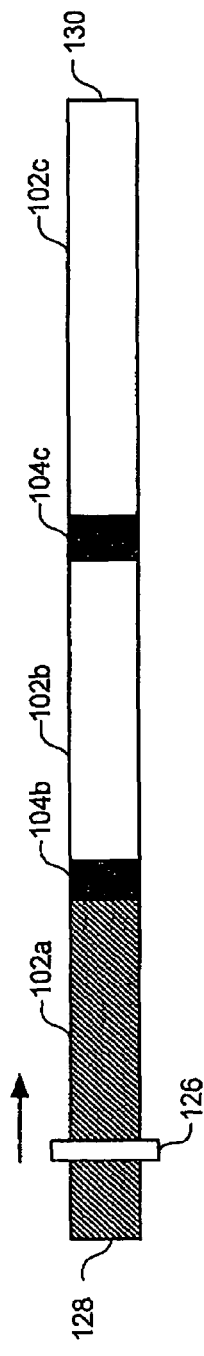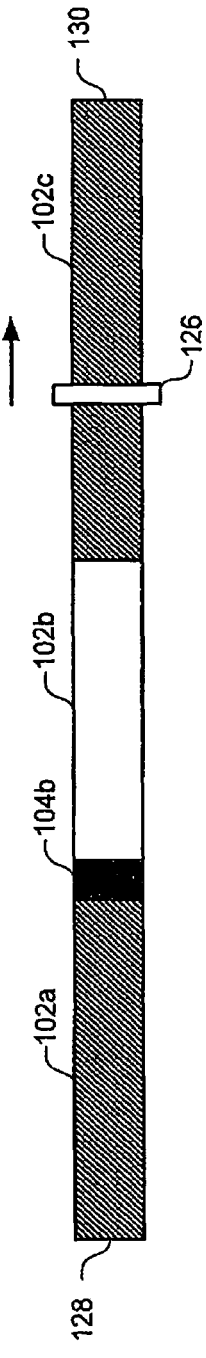

US 8,438,646 B2

SYSTEM AND/OR METHOD FOR DISTRIBUTING MEDIA CONTENT

BACKGROUND

1. Field

The subject matter disclosed herein relates to the distribution of media content.

2. Information

Commercial broadcast programming on television or radio has typically been financed through corporate sponsorship. For example, such commercial broadcast programming has typically been punctuated with advertisement spots at the beginning, end or in the middle of a programming segment such as a television or radio show. Advancements in computer technology and decreasing cost of computer components such as memory have enabled widespread use of computer technology to obtain and store prerecorded broadcasts for playback through an audio visual system such as a personal computer. For example, services such as iTunes and the like have enabled users to digitally download music and/or audio visual presentations from the Internet for a user or subscription fee. Also, video cassette recorders (VCRs) digital video recorders (DVRs) and related services such as TiVo have enabled convenient recording of television broadcasting for replay at a later time. Having features such as fast forward, however, these devices have enabled television viewers to bypass commercial advertisement segments during playback, thereby reducing the value of such advertisement segments to sponsors.

BRIEF DESCRIPTION OF THE FIGURES

Non-limiting and non-exhaustive embodiments will be described with reference to the following figures, wherein like reference numerals refer to like parts throughout the various figures unless otherwise specified.

FIGS. 2B, 2C and 2D show changes in an appearance of portions displayed in a timeline according to an embodiment.

DETAILED DESCRIPTION

Figure 1:
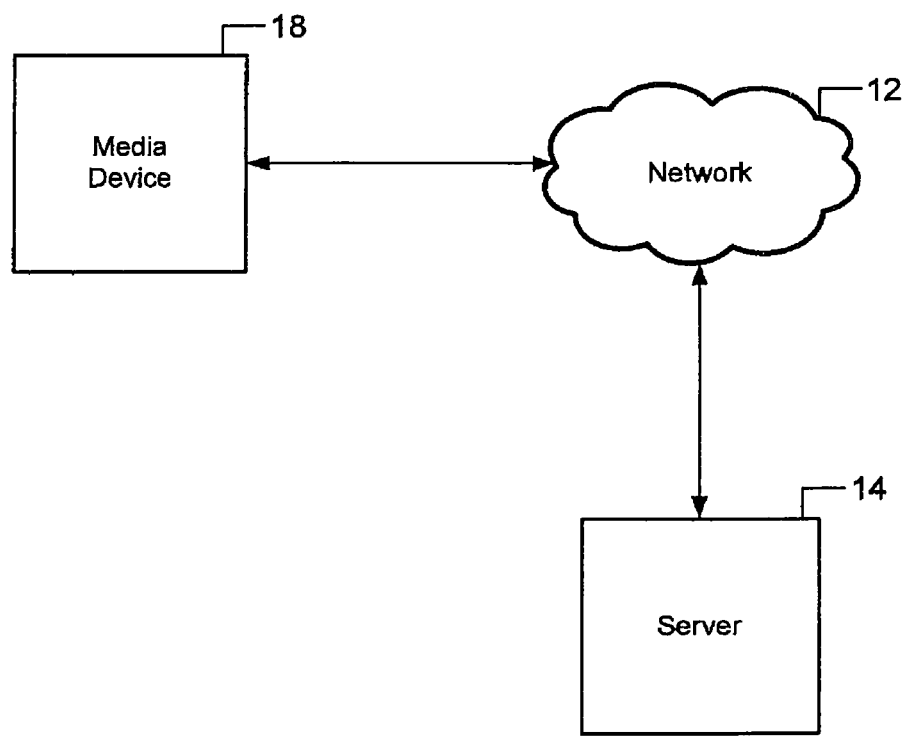
FIG. 1 is a schematic diagram of a system to distribute media content to a media device according to an embodiment.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments.

"Media content" as referred to herein relates to a signal and/or data comprising information that is representative of environmental stimuli such as sounds and/or visual images. Here, the terms "media content," "media content signal" and "media content data" shall be used interchangeably throughout. In one particular embodiment, for example, a media content signal may comprise signals which are encoded according to a predetermined format. For example, a media content signal may comprise encoded signals that are representative of audio, video, text, still images and/or other data. However, these are merely examples of a media content signal and claimed subject matter is not limited in these respects.

According to an embodiment, media content may be encoded in a particular format that enables one or more devices to "render" a "presentation" based, at least in part, on information encoded in such media content. Such a presentation may comprise, for example, images, sounds, other perceivable environmental disturbances and/or combinations thereof generated based, at least in part, on information encoded in such a media content signal. In some embodiments, media content may comprise information that may be used to render a presentation that is to be passively experienced by a viewer or listener. However, media content may also comprise "interactive media content" in which a rendering of a presentation may depend upon, or be affected by, inputs from a user and/or participant. Such interactive media content may comprise, for example, an interactive game. However, these are merely examples of a presentation that may be rendered based, at least in part, on a media content signal and claimed subject matter is not limited in this respect.

According to an embodiment, a media content segment may be "contiguous" in that rendering a presentation based upon such a contiguous media content segment provides a single contiguous presentation. Such a single contiguous presentation may comprise a presentation over a time period where information presented over the time period is inter-related. Here, such information in a single contiguous presentation presented over a time period may be inter-related base upon, for example, a theme, common production origin (e.g., an abstract aggregation of information in a news program), musical score, plot line, an event, a competitive match or game. However, these are merely example of how information presented over a time period in a single contiguous presentation may be inter-related, and claimed subject matter is not limited in these respects.

A single contiguous presentation rendered from a contiguous media content segment may comprise, for example, a single thirty-minute episode of a situation comedy as a broadcast television segment, a single song played on broadcast radio, or a single full-length feature movie. However, these are merely examples of single contiguous presentations that may be rendered from a contiguous media content segment, and claimed subject matter is not limited in these respects. In these particular examples, of a single contiguous presentation, information presented over a time period is inter-related as discussed above. In contrast, a media content segment for rendering a presentation of a first sporting event, such as a basketball game, followed by a second sporting event, such as a baseball game, may not provide such a single contiguous presentation of related information. Here, such a presentation a basketball game in a first segment may not be inter-related with a presentation of a baseball game in a second segment.

Also, a media content segment may be "atomic" in that rendering a presentation based, at least in part, on a portion of the media content less than the entire media content segment may not provide a complete presentation. In a particular example, a prerecording of four quarters of a collegiate football game may comprise an atomic media content segment. A rendering of a presentation based upon only the first three quarters, and not the fourth quarter, does not provide a complete presentation. In another example, a recording of a ninety-minute full-length feature film may comprise an atomic media content segment in that rendering a presentation for only the first sixty-minutes does not provide a complete presentation. However, these are merely examples of an atomic media content segment and claimed subject matter is not limited in these respects.

In another example, a sixty-minute television broadcast media content segment may comprise a thirty-minute episode of a situation comedy followed by a thirty-minute news program. Here, while the sixty-minute television broadcast segment may not be contiguous and atomic, the thirty-minute programs within the sixty-minute may each individually comprise contiguous and atomic media content segments. However, these are merely examples of atomic and contiguous media content segments and claimed subject matter is not limited in these respects.

A "user" as referred to herein relates to an individual and/or entity comprising an identity and is capable of receiving and/or employing a resource. In one particular embodiment, although claimed subject matter is not limited in this respect, a user may comprise an individual that is capable of interacting with applications hosted on a computing platform. In another embodiment, a user may comprise an individual that is capable of experiencing a presentation rendered from media content. However, these are merely examples of a user and claimed subject matter is not limited in these respects.

According to an embodiment, a user may have or obtain "access" to a portion of media content to perform some particular function in connection with the media content. In a particular embodiment, such access may comprise an ability of a user to perform a particular function such as navigating, manipulating, editing, storing, receiving and/or transmitting media content, and/or rendering a presentation based, at least in part, on the media content using a computing platform, for example. However, these are merely examples of particular functions in connection with media content which may be associated with access given to a user and claimed subject matter is not limited in this respect. Depending on the context, such access may be defined in connection with a particular one or more of these functions, without regard to access in connection with other ones of these functions. Accordingly, a user may obtain "access" to media content by obtaining an ability to render a presentation based, at least in part, on the media content without necessarily having an ability to navigate and/or edit the media content. In another context, "to access" or "accessing" media content may refer to an act performing one of the aforementioned particular functions. However, these are merely examples of how a user may access media content and claimed subject matter is not limited in this respect.

Broadcasters have distributed audio and visual content to audiences in the United States over terrestrial radio frequency links for decades and, more recently, over cable, wireless links and satellite links. Using such traditional distribution methods, broadcasters would traditionally receive revenue from sponsors in exchange for providing advertising for the sponsors on scheduled intervals during programming. In traditional television broadcasting, for example, commercial spots may be slotted throughout half-hour programming segments. Commercial spots are similarly scheduled throughout radio broadcasts.

The evolution of Internet technologies has enabled distribution of digital media content that had been reserved for distribution over traditional broadcast channels such as commercial television and radio. In place of advertising revenue, some on-line content distributors such as iTunes have established mechanisms whereby a user pays a fee for the ability to access media content by, for example, downloading and storing the media content to a storage device. The user may later play and/or render presentations based on the stored media content. For example, a user may establish an account with an on-line distributor by providing credit card information to be used in charging for downloading digital media content from the distributor's website to be stored on a mass storage device accessible by the user for playing the downloaded media content. Such methods, however, are cumbersome and awkward, relying on a user to provide personal credit card information to the on-line content distributor.

An alternative to having users pay for downloading media content may include embedding audio and/or visual advertisements from sponsors at selected segments in downloaded media content. Accordingly, an on-line distributor may receive advertising revenue from sponsors in exchange for advertising spots on downloaded content. Given that downloaded content is typically in a digital form and easily manipulated (e.g., using fast forward features on a digital media player or digital editing), sponsors may not find such advertising spots attractive or valuable since the on-line distributor can give little or no assurances that users would actually view and/or hear the advertising spots.

According to an embodiment, although claimed subject matter is not limited in this respect, media content downloaded from the Internet may comprise some segments that are desired for presentation by a user and other segments that are desired for presentation to the user by a media content distributor and/or sponsor. Here, in a particular embodiment, presentation of and/or access to some media content segments desired by a user may be conditioned on a presentation of other media content segments to the user as desired by a distributor and/or sponsor. Accordingly, a media content distributor may assure a commercial sponsor that individuals accessing certain media content are likely to be exposed to certain content (e.g., advertising).

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. However, these are merely examples of a storage medium and claimed subject matter is not limited in these respects.

Unless specifically stated otherwise, as apparent from the following discussion, it is appreciated that throughout this specification discussions utilizing terms such as "processing," "computing," "calculating," "selecting," "forming," "enabling," "inhibiting," "rendering," "downloading," "identifying," "initiating," "querying," "obtaining," "hosting," "maintaining," "representing," "modifying," "receiving," "transmitting," "determining" and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Such actions and/or processes may be executed by a computing platform under the control of machine-readable instructions stored in a storage medium. Further, unless specifically stated otherwise, process described herein, with reference to flow diagrams or otherwise, may also be executed and/or controlled, in whole or in part, by such a computing platform.

A "computer program" has referred to herein relates to an organized list of instructions that, when executed, causes a computing platform and/or machine to behave in a predetermined manner. Here, for example, a computer program may comprise machine-readable instructions that are executable by a computing platform to perform one or more desired tasks. In one particular embodiment, although claimed subject matter is not limited in these respects, a computer program may define inputs and outputs such that execution of the program may provide outputs based, at least in part, on the inputs. However, these are merely examples of a computer program and claimed subject matter is not limited in these respects.

According to an embodiment, a computer program may comprise one or more "software components" comprising instructions that are executable as an integrated part of the computer program. Here, for example, computer program may comprise multiple software components that are individually created to perform associated functions of the computer program. The different components may then be integrated together to provide a functioning computer program. However, these are merely examples of a computer program and claimed subject matter is not limited in these respects.

An "application" as referred to herein relates to a computer program or group of computer programs capable of providing a desired result and/or action. In a particular embodiment, for example, such an application may comprise one or more computer programs that perform tasks in connection with providing a service and/or resource to a user. For example, although claimed subject matter is not limited in these respects, an application may comprise one or more end-user computer programs such as database programs, spreadsheets, word processors, computer programs that are accessible through a network browser, electronic mail, interactive games, video and/or image processing programs, media presentation programs, calendars, financial application software, inventory control systems and/or the like. However, these are merely examples of an application and claimed subject matter is not limited in these respects.

In one particular embodiment, an application may comprise a "rendering application" that is capable of processing media content to render a presentation. For example, such a rendering application may be capable of rendering such a presentation on one or more output devices based, at least in part, on information extracted from media data such as encoded and/or compressed media content data. In another example, a rendering application may be adapted to control access to media content based, at least in part, one or more conditions and/or events. However, these are merely examples of a rendering application and claimed subject matter is not limited in this respect.

A "Web application" as referred to herein relates to an application comprising multiple software components that communicate with one another over an Internet Protocol (IP) infrastructure. In one particular embodiment, although claimed subject matter is not limited in these respects, software components of a Web application may transmit documents among one another over an IP infrastructure in any one of several standard formats including, for example, any one of several markup languages. However, this is merely an example of a Web application and claimed subject matter is not limited in these respects.

In one embodiment, a computing platform may comprise one or more "communication adapters" to enable communication between processes executing on the computing platform and a network. Such a communication adapter may comprise a device capable of transmitting information to and/or receiving information from a communication channel and/or data link. In one particular embodiment, for example, a communication adapter may be capable of transmitting information to and/or receiving information from a data transmission medium according to a predefined communication protocol. However, this is merely an example of a communication adapter and claimed subject matter is not limited in this respect.

According to an embodiment, a media content signal may comprise information that is temporally defined with reference to a presentation to a user or an audience. In a particular embodiment, for example, a media content signal comprising a video component may comprise sequential frames which are temporally referenced to portions of a time varying visual presentation. In another particular embodiment, a media content signal comprising an audio component may comprise sequential segments that are temporally referenced to portions of an audio presentation. However, these are merely examples of how a media content signal may comprise segments which are temporally referenced to portions of a presentation and claimed subject matter is not limited in these respects.

According to an embodiment, a content signal may be transmitted from a source to a destination by "streaming" the content signal whereby a first temporally referenced portion of the content signal is used at a media device to render a first portion of a presentation before a subsequent temporally referenced portion is completely transmitted and/or delivered to the media device for rendering a subsequent portion of the presentation. In a particular embodiment, for example, a media device may display images of a leading portion of a streamed video signal prior to receipt and/or delivery of a complete trailing portion of the video signal at the media device. Similarly, a media device may generate sounds based, at least in part, on a leading portion of a streamed audio signal prior to receipt and/or delivery of a trailing portion of the audio signal is being transmitted and/or delivered to the media device. However, these are merely examples of how a content signal may be streamed to a media device and claimed subject matter is not limited in these respects.

According to an embodiment, media content may comprise one or more "protected media content segments" to which access by a user may be controlled. Here, for example, a user's access to a protected media content segment (e.g., to provide a particular function as illustrated above) may be provided under a predefined condition and/or in response to a particular event. Alternatively, such a user's access to a protected media content segment may be inhibited in the absence of such a predefined condition and/or event. However, these are merely examples of a protected media content segment and claimed subject matter is not limited in these respects. Hereinafter "protected segment" shall be used interchangeably with "protected media content segment."

A "gating media content segment" as referred to herein relates to media content that a user may access to gain access to a protected media content segment. In one particular example, a user may access a gating media content signal by, for example rendering a presentation based, at least in part, on the gating media content segment. By rendering such a presentation based, at least in part, on such a gating media content segment, a user may gain access to an associated protected segment. Here, such a presentation rendered based, at least in part, on such a gating media content segment may comprise an advertisement directed to the user. In particular embodiments, a media content distributor may establish rendering a presentation of an advertisement from a gating media content segment as a prerequisite to having access to an associated protected segment. However, this is merely an example of a gating media content segment and claimed subject matter is not limited in these respects. Hereinafter "gating segment" shall be used interchangeably with "gating media content segment."

An "agent" as referred to herein relates to a process that executes on a first device and is capable of communicating with a second device over a network or independently of a network. In one particular embodiment, for example, an agent process may collect information associated with the first device, a user of the device and/or program(s), and enable transmission of the collected information to the second device. In another embodiment, an agent may receive information and/or control signals from the second device to take some action in connection with the first device. However, these are merely examples of how an agent may enable communication between devices and the claimed subject matter is not limited in these respects.

Briefly, a portion of media content may be partitioned into segments comprising one or more protected segments. A user may be selectively given access to at least one of the protected content media segments in response to accessing an associated gating segment. Alternatively, such a user may be inhibited from obtaining access to the protected segment until the associated gating media segment is accessed. However, these are merely example embodiments and claimed subject matter is not limited in these respects.

FIG. 1 is a schematic diagram of a system 10 to distribute media content to a media device 18 via a network 12. Network 12 may employ one or more data transmission mediums such as, for example, cabling (e.g., fiber optic, twisted wire pair, coaxial), satellite transmission links or wireless terrestrial wireless transmission links. However, these are merely examples of transmission media that may be used for transmitting information in a network and claimed subject matter is not limited in this respect. Additionally, network 12 may employ one or more communication protocols for transmitting information between a source and a destination such as, for example, an Internet Protocol (IP), asynchronous transfer mode (ATM) and/or communication protocols adapted for use on wireless transmission links. However, these are merely examples of communication protocols that may be used for transmitting information between a source and a destination in a network and claimed subject matter is not limited in these respects. However, these are merely examples of a network that may be used for distributing media content to a media device and claimed subject matter is not limited in these respects.

A server 14 may store media content data in memory (not shown) that may be used by media device 18 for rendering presentation to a user (not shown). Such media content may comprise, for example, encoded versions (digitally or otherwise) of musical works, photographs, movies, electronic games, live and/or recorded video (e.g., live and/or recorded television broadcasts), live and/or recorded audio (e.g., live and/or recorded radio) on-line content (e.g., on-line radio and/or television broadcasts) and/or the like. However, these are merely examples of media content and claimed subject matter is not limited in these respects.

In the particular embodiment illustrated in FIG. 1, media device 18 may comprise a communication adapter (not shown), set-top box (not shown), modem (not shown) and/or other communication device to receive media content data from one or more sources of a data transmission network (e.g., according to the aforementioned Internet Protocol). In other embodiments, media device 18 may receive content data from other sources such as, for example, physically insertable storage media such as a CD-ROM, magnetic tape, magnetic disk, USB flash device and/or the like. However, these are merely examples of how a media device may obtain media content data for use in rendering a presentation to a user and claimed subject matter is not limited in these respects.

Media device 18 may be capable of generating environmental stimuli such as, for example, sounds and/or images in response to encoded information. For example, a media device 18 may be capable of reproducing video images, music and/or other audio signals based, at least in part, on data which is encoded according to a predetermined encoding format. In one embodiment, media device 18 may comprise one or more output devices such as, for example, a display (not shown) and/or speaker (not shown) for generating environmental stimuli as part of a presentation to an audience and/or user. Alternatively, media device 18 may not necessarily include such an output device but instead may be capable of being coupled to such an output device to provide one or more signals for generating such environmental stimuli. However, these are merely examples of a media device and claimed subject matter is not limited in these respects.

According to an embodiment, media device 18 may comprise a computing platform including, among other things, a central processing unit, system memory and a communication adapter capable of transmitting and/or receiving information according to a communication protocol such as the aforementioned Internet Protocol. As such, media device 18 may be capable of hosting one or more processes by executing machine-readable instructions stored in a storage medium such as a system memory. Media device 18 may also host an operating system such as, for example, versions of Windows® sold by Microsoft Inc., versions of the Macintosh operating system sold by Apple Computer, versions of the Linux operation system (e.g., for any embedded platforms), operating systems for hand held devices and/or game platforms (e.g., for Sony Playstation and/or the like), or any other operating system that may be hosted on a platform capable of receiving information via a communication adapter (e.g., according to the IP protocol) or removable storage media. However, these are merely examples of an operating system that may be hosted on a media device and claimed subject matter is not limited in these respects.

According to an embodiment, server 14 may similarly comprise a computing platform including one or more communication adapters (not shown) to transmit information to and/or receive information from media device 18 via a data transmission network and according to communication protocol such as the aforementioned Internet Protocol, for example. Server 14 may also comprise one or more memory devices (not shown) to store media content data including, for example, one or more hard disk memory devices, optical storage media, flash memory and/or the like. However, these are merely examples of devices that may be used as memory to store media content for distribution and claimed subject matter is not limited in these respects. In an alternative embodiment, server 14 may comprise a dedicated network storage server (not shown) that is capable of streaming media content data to devices coupled to a network. However, this is merely another example of a server that is capable of providing media content data to other devices connected to a network and claimed subject matter is not limited in these respects.

According to an embodiment, server 14 may store media content in any one of several digitally encoded formats such as, for example, versions of GIF, TIFF, JPEG, JPEG2000, BMP, PNG, MPEG1/2/4, WMV, H.263, H.264, VC-1, DivX, Xvid, Real Video, Nero Digital, On2, VP6, VP7 and Quick-Time and/or the like. It should also be understood that server 14 may store such media content in yet to be developed encoding formats. However, these are merely examples of how content data may be stored and/or formatted according to particular embodiments and claimed subject matter is not limited in these respects.

Media device 18 may comprise any one of several media devices such as, for example, a portable music player such as an MP3 player, game platform, television, set-top box, display, personal computer, portable media players, hand held device and/or any other type of device capable of rendering a presentation to a user based, at least in part, on media content. Alternatively, as illustrated above, media device 18 may render such a presentation, based at least in part on the media content through one or more output devices coupled to the media device 18 (such as a display and/or speakers). Accordingly, media device 18 may be capable of rendering a presentation from media content in one or more of the aforementioned digitally encoded formats. However, these are merely examples of a media device and claimed subject matter is not limited in these respects.

According to an embodiment, media device 18 may comprise a computing platform to host one or more applications including a rendering application. Such a computing platform may comprise any one of a variety of user interfaces such as, for example, a graphical user interface responsive to user inputs from a pointing device (e.g., mouse, trackball or joystick), thumbwheel, remote control and/or console inputs, for example. Also, media device 18 may host a web browser that is capable of communicating with server 14 according to a hypertext transfer protocol (HTTP). However, these are merely examples of how a computing platform may provide a media device according to particular embodiments and claimed subject matter is not limited in this respect.

According to an embodiment, although claimed subject matter is not limited in this respect, media device 18 may host an agent that is capable of communicating with server 14 to, among other things, control and/or affect rendering of a presentation to a user from media content obtained from server 14. In a particular embodiment, such an agent may comprise a rendering application which is supported by and/or accessible through a web browser hosted by media device 18. Here, for example, such an agent may be launched to media device 18 from machine-readable instructions received from server 14 in response to user selections received at a web browser by, for example, a selection of a Universal Resource Locator (URL). In alternative embodiments, however, a media device 18 may host a rendering application to control and/or affect rendering of a presentation to a user independently of a web browser. Here, for example, such a rendering application may enable a user to render a presentation based upon media content (e.g., streamed from server 14 or downloaded and stored) independently of whether a web browser on media device 18 is in communication with server 14. As illustrated below according to one particular embodiment, although claimed subject matter is not limited in this respect, a rendering application may conditionally enable a user to access certain portions of media content comprising protected segments.

According to an embodiment, media device 18 may receive media content which is partitioned into a plurality of protected segments. In one particular embodiment, although claimed subject matter is not limited in this respect, media device 18 may receive such media content from server 14 over network 12 as illustrated above. Alternatively, again as illustrated above, media device 18 may receive such media content from a storage device coupled to and/or inserted into media device 18. Again, these are merely examples of how a media device may receive media content for rendering a presentation to a user and claimed subject matter is not limited in these respects.

Figure 2A:
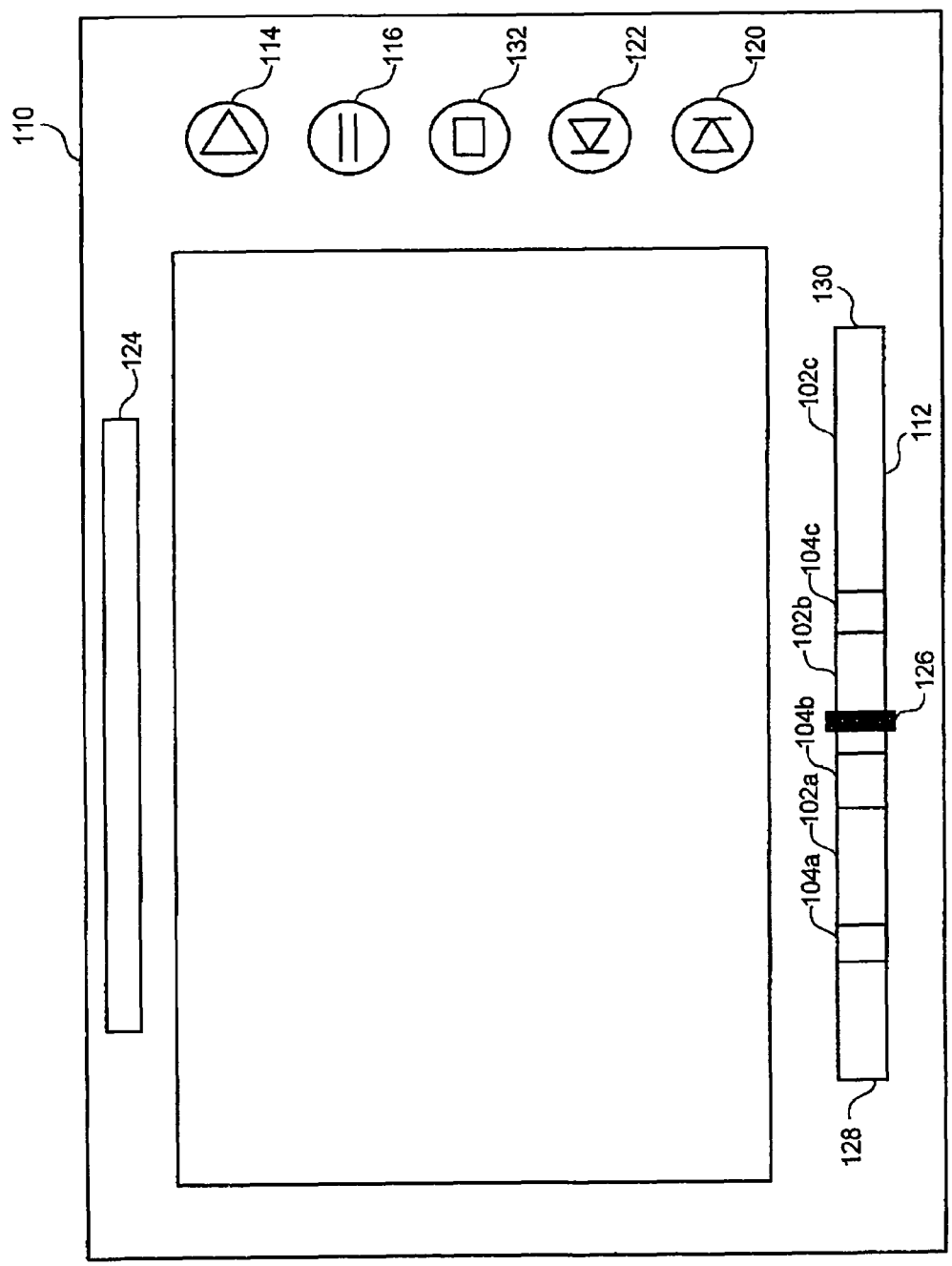
FIG. 2A is an appearance of a rendering application on a display illustrating a timeline according to an embodiment.

In one embodiment, a rendering application hosted on media device 18 may provide a display 110 as shown in FIG. 2A. In particular embodiments, although claimed subject matter is not limited in this respect, such a rendering application may receive user inputs from a graphical user interface (GUI) supported by a computing platform. Here, for example, a user may make inputs by activating a pointing device (e.g., mouse, trackball, joystick, thumbwheel, remote control, game peripheral) to move a cursor over items shown in display 110 and "clicking" to make selections. Such a GUI may also receive text inputs from a keyboard (not shown) and/or voice activated commands from a microphone (not shown) independently or in combination with inputs provided through a pointing device. However, these are merely examples of how a rendering application may receive user inputs and claimed subject matters is not limited in this respect.

Here, display 110 may show a play button 114, pause button 116, stop button 132, fast forward button 120 and rewind button 122. Selecting one of these items in display 110, with a pointing device for example, may initiate the described action in the hosted rendering application. A title 124 may indicate a content selection that is playing or is ready to play. Image portion 134 may be used for rendering still or moving images. A timeline 112, in a particular embodiment, may illustrate a temporal state of the rendering application relative to media content from a beginning 128 to an end 130.

While an associated rendering application is in a "play" state, in response to selection of play button 114 for example, timeline 112 may provide a linear scale to represent a temporal progression of a rendering of a presentation from media content where an indicator 126 may indicate where within the temporal progression the rendering application is currently playing (or positioned to play in a paused state, for example). While the rendering application is in the play state, indicator 126 may move along timeline 112 toward end 130 as a presentation is being rendered until indicator 126 reaches end 130, or the user selects the pause button 116 or stop button 132. With or without playing media content, a user may select fast forward button to move indicator 126 away from beginning 128 and toward end 130, or select the rewind button 122 to move indicator 126 toward beginning 128 and away from end 130. Alternatively, a user may move indicator 126 by clicking on and dragging indicator 126 along timeline 112. Following such movement of indicator 126 along timeline 112, the rendering application may commence playing media content at a point in a temporal position as indicated by the position of the moved indictor 126 relative to timeline 112.

According to an embodiment, media content represented by timeline 112 may be partitioned into a plurality of protected segments. According to a particular embodiment, a user may first access a gating segment associated with a protected segment to gain access to the protected segment. Here, for example, such access to a gating segment may be established as a prerequisite for access to the protected segment. Such access to the gating segment may comprise, for example, rendering a presentation to a user (e.g. paid advertisement) based, at least in part, on the gating segment. As shown in FIG. 2A, media content, as represented by timeline 112, is partitioned into a plurality of sequential protected segments 102 which are preceded by associated gating segments 104. Here, such protected segments 102 are sequentially interleaved with gating segments 104. Such media content may comprise, for example, content data that a rendering application may use to render as a sequential and time varying presentation such as an audio presentation, video presentation or combination of audio and video presentation which is encoded according to any one of the aforementioned encoding formats. For example, protected segment $102_a$ may represent a portion of a presentation that precedes a presentation of protected segment $102_b$. Likewise, protected segment $102_b$ may represent a portion of a presentation that precedes a presentation of protected segment $102_c$. Accordingly, in a temporal progression associated with media content represented by timeline 112, from left to right protected segment $102_a$ precedes protected segment $102_b$, and protected segment $102_b$ precedes protected segment $102_c$.

According to a particular embodiment, although claimed subject matter is not limited in this respect, protected segments 102 may be selected from a contiguous and/or atomic media segment. As such, protected segments 102 may comprise different portions of the same presentation such as, for example, a complete episode of a television situation comedy, a complete news program, complete sporting event and/or the like. While protected segments 102 may be selected from the same contiguous media segment, it should be understood that not all portions of such a contiguous media segment are necessarily included in a protected segment 102. Here, for example, some portions of such a contiguous media segment may remain unprotected and be accessible to a user without first accessing a gating segment.

In the particular embodiment illustrated in FIG. 2A, protected segments 102 are preceded by associated gating segments 104. Here, a user may access a protected media segment 102 after first accessing its associated gating segment 104 by, for example, rendering a presentation based, at least in part, on the associated gating media segment 104. In a particular example, although claimed subject matter is not limited in this respect, protected segments 102 may comprise portions of an episode of pre-recorded television programming and gating segments 104 may comprise advertisement provided by paid sponsors. Continuing with the particular example, such a rendering of the associated gating segment 104 may comprise presentation of a commercial advertisement. Without a user first accessing the associated gating segment 104, the rendering application may not enable the user to access the associated protected media segment 102 for presentation of an associated portion of the episode. To search, navigate, manipulate, use and/or otherwise access a protected segment 102 for rendering a presentation, for example, a user may first render a presentation based, at least in part, on an associated gating segment 104.

According to an embodiment, a rendering application may enable a user to re-access a protected segment 102 following an initial access to an associated gating segment 104 without accessing the gating segment 104 a second time. For example, following a presentation of a protected segment 104, a user may reposition indicator 126 (e.g., by selecting the rewind button 122 or clicking on and dragging indicator 126 as illustrated above) at the beginning or the middle of protected segment 104 and commence playing, without rendering a presentation from an associated gating segment 102 for a second time.

In alternative embodiments, it may be desired to have a user presented with media content rendered from a gating segment 102 more than once before the user is given unconditional access to an associated protected segment 104. Here, for example, a user may access a protected segment 104 a first time following rendering a presentation based, at least in part, on an associated gating segment 102. To access the protected segment 104 a second time, however, the user may be required to again render the presentation based, at least in part, on the gating segment 102. This requirement may continue for subsequent accesses to protected segment 104 until the user has rendered a presentation based, at least in part, on the associated gating segment 102 a set number of times. After having rendered the associated gating segment 102 the set number of times, the user may be given unconditional access to the protected segment 104. Again, however, this is merely an alternative embodiment and claimed subject matter is not limited in this respect.

According to a particular embodiment, although claimed subject matter is not limited in this respect, segments of timeline 112 in display 110 may visually represent characteristics of media content which are temporally associated with the segments of timeline 112. For example, and as illustrated below with reference to FIGS. 2B, 2C and 2D, a rendering application may visually distinguish between protected segments 102 and gating segments 104 in timeline 112 by, for example, providing color, hatching or other patterns, shading, blinking, markers, text, icons or images to name just a few ways that a rendering application may visually distinguish between segments in a timeline from one another.

While embodiments illustrated above may visually distinguish between gating segments and protected segments, in alternative embodiments a rendering application may not particularly visually set out or distinguish between gating segments and protected segments in a timeline. Here, for example, a user may access gating segments, as needed, to gain access to associated protected segments.

In one particular embodiment, a visual appearance of a gating segment 102 and/or an associated protected segment 104 in timeline 112 may change following use of the gating segment 102 to render a presentation to a user, for example. In a particular embodiment shown in FIG. 2B, protected segments 102 appear clear while gating segments 104 appear solid. Here, the solid appearance of gating segments 104 may indicate that gating segments 104 have not been used to render a presentation to a user and the clear appearance of protected segments 104 may indicate that they are "locked" or inaccessible by the user. By commencing playing at beginning 128, for example, a rendering application may render a presentation based, at least in part, on gating segment $104_a$ as indicator 126 moves toward end 130. The rendering application may then commence rendering a presentation based, at least in part, on unlocked protected segment $102_a$.

As shown at FIG. 2C, an appearance of protected segment $102_a$ may change as shown by cross-hatching to indicate that protected segment $102_a$ is unlocked and is accessible to the user. In this particular embodiment, although claimed subject matter is not limited in this respect, gating segment $104_a$ disappears or is absorbed into the unlocked protected segment $102_a$. However, this is merely an example of how a rendering application may visually indicate that a gating segment has been used to render a presentation or has otherwise been accessed, and claimed subject matter is not limited in this respect. In other embodiments, for example, a rendering application may merely continue to show such a gating segment that has been accessed in a timeline (e.g., as being distinct from an associated protected segment), but with a visual appearance that is distinguished from a visual appearance of gating segments which have not been accessed. This change in appearance of gating segment $104_a$ and/or protected $102_a$ as shown in FIG. 2B to FIG. 2C may indicate to the user, for example, that protected segment $102_a$ may be re-accessed (e.g., to be replayed) without rendering a presentation from the gating segment $102_a$ for a second time as illustrated above. As illustrated above according to an alternative embodiment, subsequent unconditional access to a protected segment may require a set number of two or more accesses to an associated gating segment. Here, a visual appearance of such a protected segment and/or gating segment may change following such a set number of accesses to the gating segment, As illustrated in FIG. 2D, following a rendering of a presentation based, at least in part, on gating segment $104_a$, a user may skip over gating segment $104_b$ and associated protected segment $102_b$ to access gating segment $104_c$ by, for example, clicking on and dragging indicator 126 and/or fast forwarding, without first accessing gating segment $104_b$ to unlock protected segment $102_b$. Here, protected segment $102_c$ is shown as unlocked (cross-hatched) and protected segment $102_b$ is shown as still locked (clear). To subsequently access locked protected segment $102_b$, a user may reposition indicator 126 to render a presentation based, at least in part, on gating segment $104_b$ to unlock protected segment $102_b$.

While FIGS. 2B, 2C and 2D show changes in visual appearances of protected segments 102 from clear to cross-hatching, and gating segments 104 from solid to combined with associated protected segments 102, it should be understood that other embodiments may implement different types of changes in visual appearance of segments in a timeline. For example, such a change in visual appearance of a gating segment 104 and/or protected segment 102 may comprise, for example, a change in color, shading, blinking, brightness, hatching or other patterns, just to name a few visual characteristics that may change to distinguish between protected segments which are locked versus unlocked, or between gating segments which have be accessed versus gating segments which have not been accessed.

Referring again to FIG. 2A in a particular embodiment, a rendering application may provide a user with additional information regarding a particular segment in timeline 112 which is descriptive of the content in the particular segment. For example, a rendering application may provide an overlaid text message on display 110 or an audio message descriptive of content in a segment in timeline 112 in response to a positioning of a cursor in display 110 over or near the segment. In a particular example where protected segments 102 in timeline 112 are associated with a pre-recorded television episode, such a message may describe the contents of the particular protected segment 104 (e.g., "this is where Jack and Locke open the hatch"). Similarly, where gating segments 102 in timeline 112 are associated with advertisements, such a message may describe the product and/or service that is being advertised in a particular gating segment 102. However, these are merely examples of messages that a rendering application may provide in connection with the contents of segments in a timeline and claimed subject matter is not limited in this respect.

While media content in the example illustrated above comprises pre-recorded television programming, it should be understood that this merely one example of media content that may be partitioned into a plurality of protected segments. Other examples may include pre-recorded events, radio broadcasts, audio or video content (including repurposed television and/or radio content and original content developed specifically for distribution over system 10) songs or other musical works, just to name a few. Again, these are merely examples of media content and claimed subject matter is not limited in these respects. Also, the particular example above gating segments 104 comprised commercial advertisements. It should be understood, however, that gating segments may comprise any other types of content such as, for example games, puzzles, surveys, questionnaires, polls, riddles, trivia questions, authentication and/or authorization queries, requests for payment, just to name a few types of content that may be used as a gating segment. Again, these are merely examples of gating segments that may be used to render a presentation for obtaining access to protected segments, and claimed subject matter is not limited in this respect.

Figure 3:
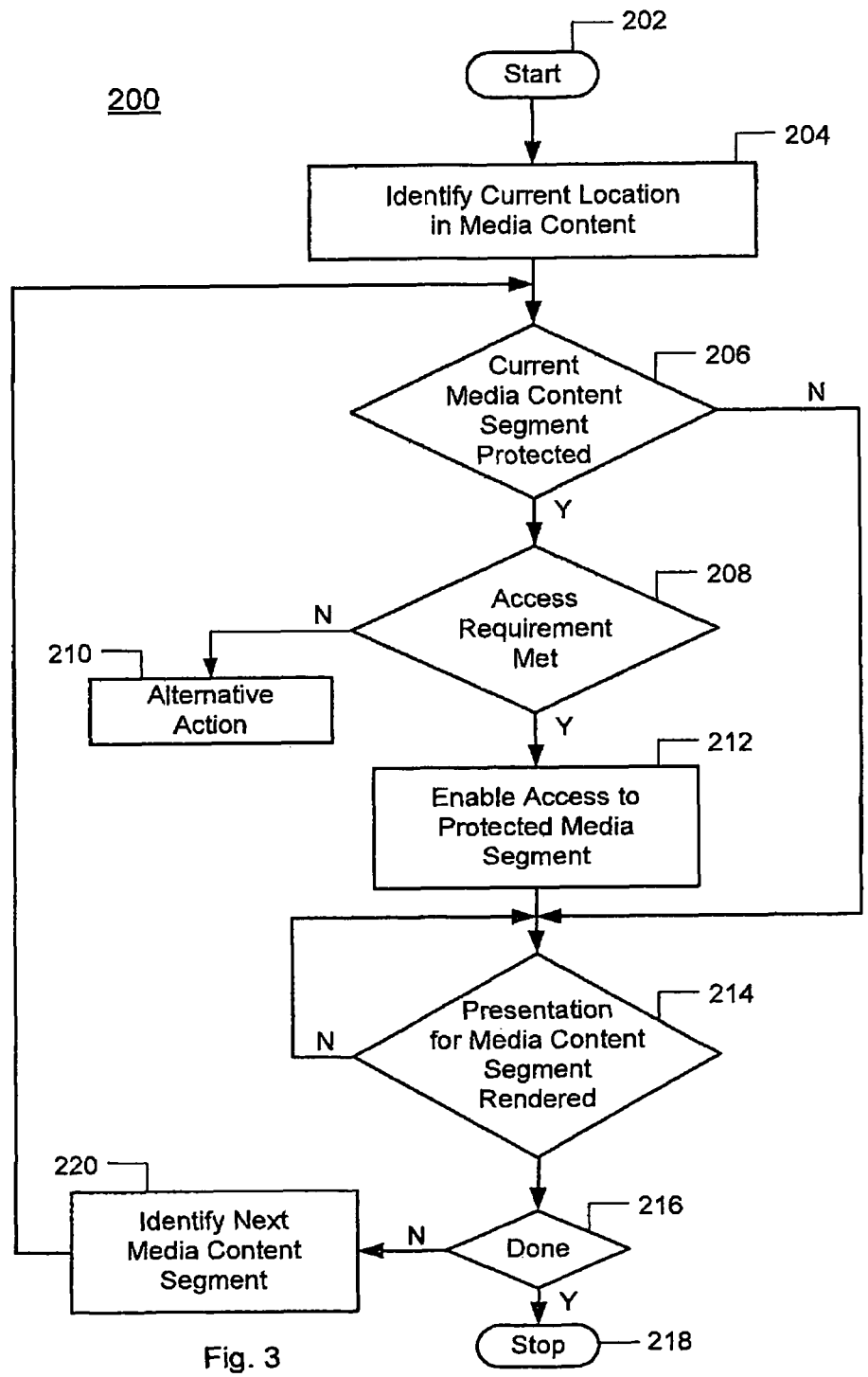
FIG. 3 is a flow diagram illustrating a process to enable access to protected segments according to an embodiment.

According to an embodiment, although claimed subject matter is not limited in this respect, a user may be given access to protected segments according to a process 200 shown in FIG. 3. Here, or example, process 200 may be executed, at least in part, by an agent and/or rendering application hosted on a media device to control and/or affect rendering of a presentation to a user as illustrated above. In the particularly illustrated embodiment, segments of media content may be sequentially accessed and/or rendered for presentation to a user (e.g., on a media device as discussed above) as represented by timeline 112 as illustrated above, for example.

Segments of media content, such as segments represented by protected segments 102 and gating 104 in timeline 112, may be associated with a memory address, unique identifier and/or URL. In other embodiments, such segments may be associated with metadata stored or maintained in session memory such as, for example, session memory maintained by a rendering application hosted on media device and/or session memory maintained by a server transmitting media content to the media device. However, these are merely examples of how a rendering application may identify a segment of media content and claimed subject matter is not limited in this respect. Process 200 may start at 202, for example, in response to a user selecting start button 122, in a GUI for example. Block 204 may identify a current position or location in time varying media content which may be linearly associated with a location of indicator 126 in timeline 112 (e.g., which may be at the beginning of timeline 112, the end of timeline 112 or somewhere in between). Accordingly, such a current position or location may lie within a particular segment referenced by a timeline (e.g., a protected segment or gating segment). Based upon an identifier associated with the current media content segment, for example, diamond 206 may determine whether the current media content segment is a protected segment.

As pointed out above according to a particular embodiment, protected segments may be selected from a contiguous and/or atomic media content segment. As such, protected segments detected at diamond 206 may comprise different portions of the same presentation. Again, while such protected segments may be selected from the same contiguous media segment, it should be understood that not all portions of such a contiguous media segment are necessarily included in a protected segment to control access by a user. Accordingly, some media content segments as part of a contiguous media content segment may be neither a gating segment nor a protected segment.

If the current media content segment is not a protected segment, a user may be free to access the segment without any special conditions. Otherwise, if the current media content segment is protected, diamond 208 may determine requirements to access the protected segment have been met. As illustrated above, such an access requirement may be met if a rendering application had already accessed an associated gating segment one or a set number of times, or if such an associated gating segment had been accessed prior to access of an associated protected segment. If such access requirements have been met, block 212 may provide a user with access the current, protected segment by, for example, rendering a presentation based, at least in part, on the protected segment. Otherwise, block 210 may perform an alternative action.

Referring again to the particular examples of FIGS. 2A through 2D, if a current media content is a protected segment 102, for example, diamond 208 may determine whether an associated gating segment 104 has been used to render a presentation, such as an advertisement, to the user. If the gating segment 104 has been rendered, block 212 may provide a user with access to the current protected segment 102. However, this is merely an example of how a process may provide a user with access to a protected segment based, at least in part, on whether an associated gating segment has been accessed, and claimed subject matter is not limited in this respect.

Upon completion of rendering a presentation of the current media content segment as determined at diamond 214, block 220 may identify a next media content segment (e.g., in a timeline such as timeline 110) if there are any remaining media content segments. Otherwise, process 200 may terminate at 218.

According to an embodiment, although claimed subject matter is not limited in this respect, an alternative action at block 210 may comprise any one of several alternatives to enabling a user to access a protected segment such as, for example, rendering a presentation of different media content, rendering an incomplete presentation from the protected segment and/or the like. Referring to the example of FIG. 2A, in a particular embodiment where a protected segment comprises a video and audio component such as in a pre-recorded television broadcast, such an alternative action may comprise displaying a still banner in image portion 134 with a message indicating that viewing a preceding gating segment is required prior to accessing the current protected segment or giving a written summary description of the protected segment (e.g., "this is where you see Jack and Locke open the latch"). Such a written message may be accompanied by an audio narrative, for example. In another embodiment, alternative action at block 210 may comprise displaying such a still banner with an audio portion of the protected segment (i.e., without the video portion). In another embodiment, alternative action at block 210 may comprise providing an introduction or teaser segment for the protected segment. It should be understood, however, that these are merely examples of actions that may be alternatives to enabling access to a protected segment in the absence of a prerequisite access to an associated gating segment, and claimed subject matter is not limited in these respects.

In one embodiment, protected segments may be encrypted according to an encryption key. Here, for example, a rendering application may be given access to such a protected segment at block 212 by obtaining a key to decrypt a protected segment upon rendering a presentation to a user based, at least in part, on an associated gating segment. For example, such an encryption key may be embedded in the gating segment and extracted by the application upon rendering a presentation based, at least in part, on the gating segment. Alternatively, a rendering application may transmit a message (e.g., to a server on a network), indicating completion of rendering the presentation based, at least in part, on the gating media content signal to receive such an encryption key. However, these are merely examples of how an application may obtain an encryption key to gain access a protected segment and claimed subject matter is not limited in this respect.

Figure 4:
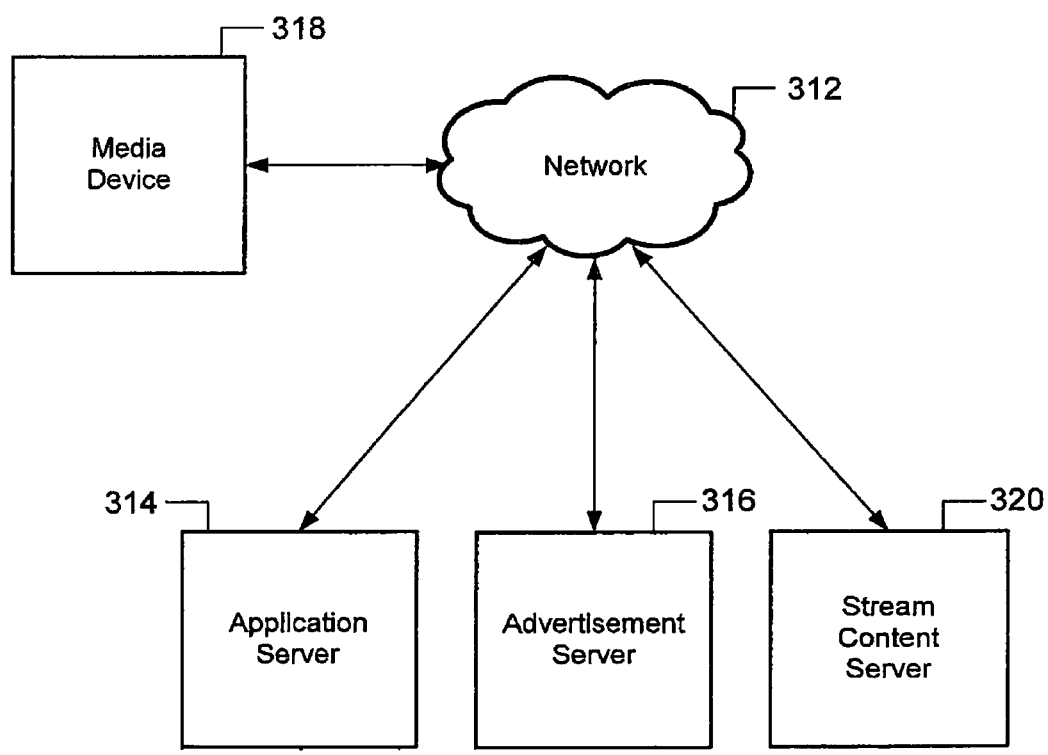
FIG. 4 is a schematic diagram of a system to distribute media content to a media device according to an alternative embodiment.

In another embodiment, protected segments may be streamed to a rendering application (e.g., from a remote server over a network). Here, for example, a rendering application (e.g., as illustrated in FIG. 3) may maintain a record of which gating segments have been used to render a presentation to a user. Accordingly, block 212 may initiate streaming of a protected segment from a remote server to the application if the application determines that the user has rendered a presentation of an associated gating segment by, for example, transmitting a message to the remote server over a data communications network as illustrated below with reference to FIG. 4.

Figure 5:
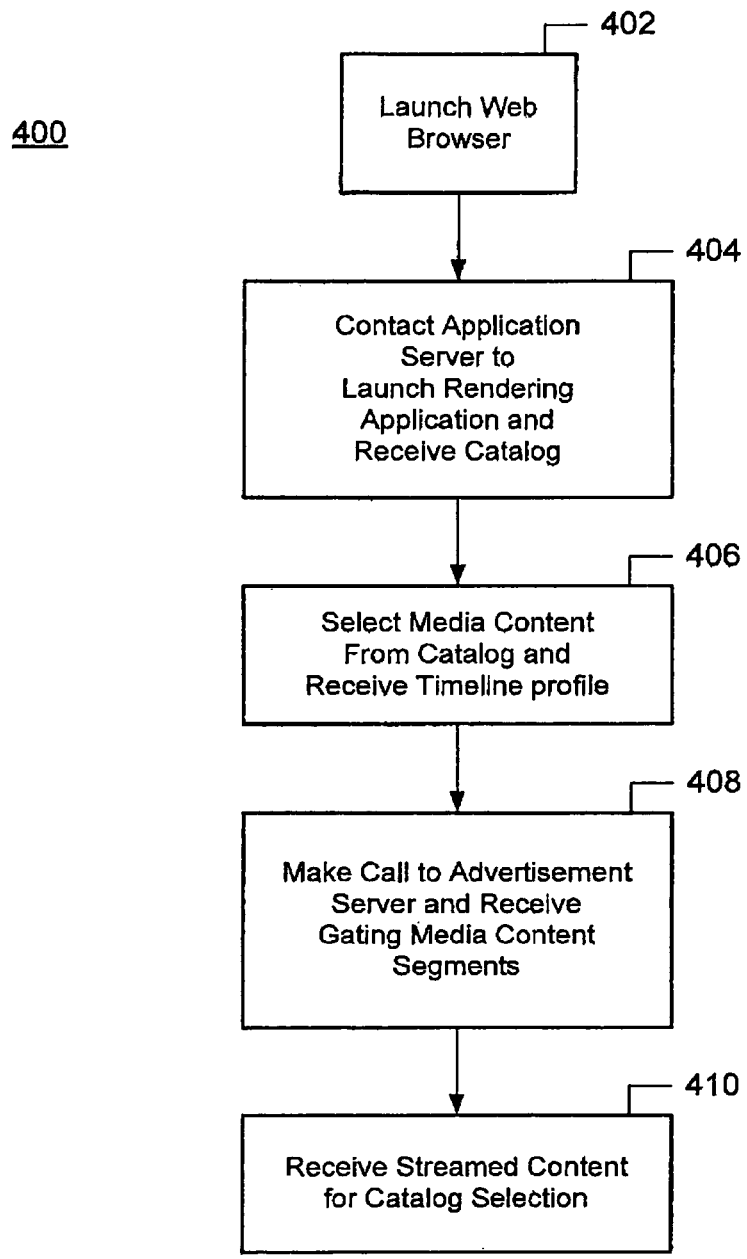
FIG. 5 is a flow diagram illustrating a process to distribute media content to a media device according to an embodiment.

In system 300, for example, a media device 318 may be enabled to receive protected segments as streamed media content from a stream content server 320 in response to an indication that an associated gating segment has been used to render a presentation to a user. In this particular embodiment, media device 318 may interact with an application server 314, advertisement server 316 and stream content server 320 over a data transmission network such as network 312, for example. In one embodiment, as illustrated by process 400 of FIG. 5, media device 318 may comprise a computing platform and launch a web browser at block 402. However, this is merely an example of a media device according to a particular embodiment and claimed subject matter is not limited in this respect.

In one embodiment, application server 314, advertisement sever 316 and stream content server 320 may reside on separate computing platforms that communicate with network 312. While application server 314, advertisement sever 316 and stream content server 320 are shown as separate units, it should be understood that such servers may reside on the same or co-located computing platforms. According to an embodiment, Also, in a particular embodiment, application server 314, advertisement server 316 and stream content server 320 may individually or collectively comprise "services" for providing information to media device 318 and to one another. Also, applications hosted on media device 318, application server 314, advertisement server 316 and stream content server 320 may be integrated by one or more "web services" using an Internet protocol (IP) infrastructure. In particular examples of a web service, although claimed subject matter is not limited in these respects, standard protocols may be employed to transmit data objects among components over an Internet protocol such as, for example, HTTP, HTTPS, XML, SOAP, WSDL and/or UDDI standards. Here, XML may be used to tag data objects, SOAP may be used to transfer data objects, WSDL may be used to describe available services and UDDI may be used to list available services. However, these are merely examples of protocols that may enable a web service and claimed subject matter is not limited in these respects. In one particular embodiment, although claimed subject matter is not limited in these respects, such a web service may allow independently created and implemented applications from different network sources to communicate with one another.

By locating an address associated with application server 314, such as a URL, a user may contact application server 314 at block 404. In response to such a contact from the user, for example, application server 314 may provide machine-readable instructions to media device 318, enabling media device 318 to host a rendering application. Such a rendering application may control and/or affect rendering of a presentation to a user from protected segments that may be obtained from stream content server 320. As illustrated above, such a rendering application may be supported by and/or accessed through the launched web browser. Again, however, this is merely an example of how a media device may host an application to communicate with other processes on a network and claimed subject matter is not limited in this respect.

By providing a rendering application from application server 314, an entity owning and/or operating application server 314 may control access to media content through the rendering application by, for example, implementing rules and policies governing when and how users may access media content, and which media content a user may access. Also, as illustrated below according to particular embodiments, by providing a rendering application, the entity owning and/or operating application server 314 may implement a system to obtain revenue from a separate entity owning and/or operating advertisement server 316.

Furthermore, an entity owning and/or operating application server 314 may pay a fee to a separate entity owning and/or operator stream content server 320 in exchange for delivery of media content to a rendering application hosted on media device 318. Alternatively, the entity owning and/or operating application server may pay such a fee to a party holding copyrights to media content delivered to such a rendering application hosted on media device 318.

In addition to launching an application received from application server 314, media device 318 may receive a catalog of selectable media content items that may be accessible through the rendering application hosted on media device 318. Such a catalog may provide, for example, a listing of items displayed on a web browser associated with links which may be selected for access to media content associated with the listed items. In addition, media device 318 may receive a "timeline profile" from application server 314 comprising metadata regarding protected segments selected from particular catalog items, and gating segments to be associated with such protected segments. Here, for example, such metadata may identify particular segments in a catalog item such as, for example, a temporal ordering of such segments in an associated timeline (e.g., as displayed) and which segments are protected segments. However, these are merely examples of metadata associated with catalog items that may be provided to a media device, and claimed subject matter is not limited in this respect.

In one embodiment, application server 314 may provide a timeline profile for a particular item in response to selection of a link at media device 318 associated with a particular media content selection. Alternatively, such a timeline profile for items in a catalog may be bundled with the catalog that is received at media device 318. However, these are merely examples of how a media device may receive metadata associated with a catalog item and claimed subject matter is not limited in these respects.

In addition, such metadata in a timeline profile may characterize gating segments associated with the protected segments and may comprise application centric metadata and/or content centric metadata. Such application centric metadata may include, for example, information indicating where gating segments are placed in a temporal ordering of media content segments in a timeline, information identifying specific advertising media content, duration of particular gating segments in the timeline, to name just a few examples. Content centric metadata may comprise information that is associated with and/or descriptive of selected media content including, for example, information indicative of a duration, plot summary, and/or the type, character and/or genre of the selected media content (e.g., soap opera, pre-recorded sports broadcast, type of music selection, full-length feature titles, MPAA rating). However, these are merely examples of application centric metadata and content centric metadata, and claimed subject matter is not limited in these respects.

To obtain gating segments for accessing protected segments of a timeline, at block 408 a rendering application hosted on media device 318 may call advertisement server 316 at block with information based, at least in part, on the aforementioned metadata characterizing the gating segments received in the timeline profile. Based upon information in this call, advertisement server 316 may return gating segments to be associated with protected segments in the timeline. As illustrated above, by accessing these returned gating segments (e.g., rendering presentations based, at least in part on the returned gating segments), a rendering application may provide a user with access to associated protected segments.

While advertisement server 316 may provide media content for gating segments according to particular embodiments, it should be understood that such media content for gating segments may originate from other sources such as, for example, application server 314.

In a particular embodiment, for example, a timeline profile may include addresses and/or URLs for links to stream content server 320. Selecting such a link at device 318 may result in receipt of a data stream from stream content server comprising the protected segment associated with the link. If a particular gating segment in a timeline profile has been used to render a presentation to a user, for example, at block 410 the rendering application may provide the user with access an associated protected segment (e.g., for rendering a presentation) using the associated address and/or URL to the stream content server 320. Accordingly, as illustrated above in connection with the particular embodiment of FIG. 3 at block 212, a rendering application may enable a user to access to a protected segment by making available an address and/or URL on stream content server 320 associated with the protected segment.

As protected segments may be streamed from stream content server 320 to media device 318 in a particular embodiment, the application may buffer a sufficient amount of the protected media segment at any one time render an uninterrupted presentation. However, the application need not store the entire protected segment on media device 318 and may discard and/or overwrite in memory any stored portions of the protected segment following a rendering of an associated portion. Accordingly, unintended copying and/or pirating of a streamed protected segment may be prevented.

It should be understood that protected segments in media content may be provided to media device 318 in a form different from streamed files from stream content server 320. For example, one or more protected segments may be provided in encrypted form as illustrated above. Also, in a particular embodiment "partitioning" media content, such as atomic and/or contiguous media content, may comprise a physical segmentation of information associated with particular segments on, for example, segmented mediums or memory addresses and/or the like. However, such a partitioning of media content may also include a partitioning as delivered, rendered for presentation and/or as experienced by a user. Here, for example, while stream content server 320 may store media content contiguously as a stream file in a storage medium, the streamed delivery of such media content to media device 18 may be segmented in time to thereby partition the contiguously stored media content. Although the stream content server may contiguously store media content, a user at media device 318 may experience the stored content as being partitioned into segments. As illustrated above with reference to block 408 according to a particular embodiment, advertisement server 316 may provide to media device 318 gating segments associated with protected segments in a timeline profile in response to a call from media device 318. As pointed out above, such a call may include metadata associated with gating segments in a timeline profile. It should be understood, however, that advertisement server 316 may use this metadata and/or other information to select gating media to be associated with protected segments in a timeline profile such as, for example, a user profile associated with the user, time of day, day of week, calendar date geographic location of user, and/or the like.

Regarding information concerning the time of day, day or week and/or calendar date, advertisement sever 316 may target advertisement believed to have a strong impact at these times. In one example, gating segments in evening hours may be used for advertising pizza delivery while gating segments in morning hours may be used for advertising breakfast cereal. In another example, gating segments in the second week of December may be directed to holiday shopping while gating segments in the first week of January may be targeted to products and services directed to health and fitness. In yet another example, gating segments in Friday evening may be directed to wine, beer and spirits while gating segments in Sunday morning may be directed to hangover remedies. However, these are merely examples of how gating segments may be selected based, at least in part, on a time and claimed subject matter is not limited in this respect.

According to an embodiment, a call to advertisement server at block 408 may provide information such as, for example, a source IP address and/or other information identifying a geographic location of media device 318. Using a source IP address, for example, advertisement server 316 may determine a geographic location of media device 318. However, this is merely an example of how a server may determine a geographic location of a media device and claimed subject matter is not limited in this respect. Accordingly, in a particular embodiment, advertisement server 316 may provide gating segments comprising advertisements for businesses local to media device 318.

According to an embodiment, a call to advertisement server 316 at block 408 may provide information identifying a user. Such information may comprise, for example, a user identifier that is associated with a user's user profile in a database maintained and/or accessible by advertisement server 316. Advertisement server 316 may then select gating segments to be associated with protected segments in a particular timeline profile based, at least in part, on such a user profile. Here, such a database may associate the user identifier with a user profile including information such as, for example, age, gender, income, user preferences, tastes, past purchasing behavior, past content viewing behavior that may be used for determining gating segments tailored to the user. Some information in such a database, such as past content viewing behavior, may be collected from application server 314 using, for example, a web service to update the database in response to catalog selections. Other such information may be obtained from other sources.

According to an embodiment, although claimed subject matter is not limited in these respects, advertisement server 316 may provide gating segments that are interactive with particular users. For example, in addition to merely rendering a presentation based, at least in part, on a gating segment, a user may be required to "click through" documents (e.g., HTML documents) to gain access to an associated protected segment (e.g., at diamond 208 of FIG. 3). Such an interactive gating segment may include links to a sponsor's website providing additional information and/or enabling a user to purchase a good or service from the sponsor. In other embodiments, advertisement server 316 may collect fees and/or revenue from sponsors based, at least in part, on a number of selections, "clicks", website visitations, and/or the like.

According to particular embodiments, application server 314 and advertisement server 316 may be owned and operated by the same entity. In alternative embodiments, advertisement server 316 may be owned and operated by an entity different from the entity that owns and operates application server 314. In this particular embodiment, an entity owning and operating advertisement server 316 may pay fees to the entity owning and operating application server 314 for the placement of gating segments in content to be accessed by user subscribers. The entity owning and operating advertisement server 316 may then in turn receive a fee from sponsors whose goods and/or services may be advertised in gating segments provided by advertisement server 316.

In another embodiment, although claimed subject matter is not limited in this respect, application server 314 and stream content server 320 may be owned and operated by different entities. Also, content stored and distributed by stream content server 320 may be subject to copyrights owned by yet another entity. Accordingly, a media content distributor owning and operating application server 314 may contract with an entity that owns and operates stream content server 320 to provide stream content to users for a fee. Also, or in the alternative, such a fee may be paid to an entity owning copyrights to the media content that is being distributed through stream content server 320, if that is a different entity from the entity that owns and operates stream content server 320. Here, such a fee paid to the owner and operator of stream content server 320 may comprise a flat rate fee (e.g., over a daily, weekly or monthly period) or a fee paid per catalog item selected and accessed through media device 318 or other such media devices (not shown). In turn, as illustrated above, an entity owning and/or operating application server 316 may collect a fee from advertisement server 316 for the placement of advertisements in gating segments.

In particular embodiments illustrated above, a rendering application may require a user to receive a presentation of or otherwise access a gating segment before permitting the user to access an associated protected segment. According to particular embodiments of systems shown in FIGS. 1 and 3, a user may obtain access to media content through a rendering application as part of a subscription service. In addition, such systems may distinguish among premium subscribers and non-premium subscribers. Buy paying a fee, for example, a premium subscriber may be able to access protected segments in media content without being required to first access associated gating segments. In the particular embodiment of system 300, for example, such a premium subscriber may receive media content from stream content server 320 without having to view presentations rendered from gating segments (e.g., provided by advertisement server 316). Here, application server 314 may recognize a user as a premium user at block 404 when a user contacts application server 314 to launch a rendering application by, for example, a user identifier associated with the user or other information provided in an authentication process (not shown). The launched rendering application may then be adapted to enable the premium subscriber to access protected segments, through stream content server 320 for example, without first accessing associated gating segments.

Particular embodiments described above may be applicable to systems where a media device, comprising a computing platform for example, is connected to one or more servers to receive media content according to the aforementioned Internet Protocol. Here, for example, such a media device may transmit information to and/or receive information, including media content for instance, from one or more servers via a broadband connection and/or an Internet Service Provider (ISP) that supports communication according to the aforementioned HTTP protocol.

It should be understood, however, that other embodiments may be directed to distributing media content to media devices through different connections and communication protocols such as, for example, broadcast cable, broadcast satellite and/or communication protocols adapted for wireless links. Here, for example, a media device comprising a set-top box may be connected to one or more output devices (e.g., television, home theatre/audio system and/or the like) to render a presentation based, at least in part, on media content received from a broadcast connection. A rendering application may be hosted on the set-top box to control access to protected segments of media content based, at least in part, on previous access to associated gating segments as illustrated above. In a particular embodiment, although claimed subject matter is not limited in this respect, such a rendering application may provide a display on an output device (e.g., television) as part of a GUI that responds to controls from a set-top box remote control, for example.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A method comprising:
providing a plurality of protected segments from a contiguous media content segment;
sequentially interleaving a plurality of gating media segments among said plurality of protected segments according to a timeline profile;
selectively providing a user access to each one of said protected segments in response to accessing each associated one of said plurality of gating media segments interleaved to be positioned preceding to its associated one of said protected segments according to said timeline profile, wherein one or more of said plurality of gating media segments, when accessed, result in display of links to at least one website operated by one or more sponsors; and
determining a fee based, at least in part, on selection of said displayed links.

2. The method of claim 1, wherein said contiguous media content segment comprises an atomic media content segment.

3. The method of claim 1, wherein said providing said access comprises enabling said user to render a presentation based, at least in part, on at least a portion of said protected segments.

4. The method of claim 1, wherein said gating media segment comprises advertisement.

5. The method of claim 1, wherein said media content segment comprises an encoded audio and/or video presentation.

6. The method of claim 1, wherein said media content segment comprises interactive media content.

7. The method of claim 1, and further comprising associating gating media segments with said protected segments.

8. The method of claim 1, and further comprising encrypting said plurality of protected segments according to associated encryption keys, and wherein said selectively providing said user access further comprises providing an encryption key associated with said protected segment to said user in response to said access of said gating media segment.

9. The method of claim 1, and further comprising:
providing an agent to reside on a computing platform associated with said user; and transmitting said protected segments to said agent.

10. The method of claim 9, and wherein said transmitting said protected segments to said agent further comprises transmitting said at least one protected segment in response to detecting a rendering of a presentation based, at least in part, on said media gating segment.

11. The method of claim 1, and further comprising:
maintaining a database of user profile information associated with said user; and
providing at least one gating media segment associated with said plurality of protected segments based, at least in part, on said profile information.

12. The method of claim 11, and further comprising updating said user profile information in response to purchasing behavior associated with said user.

13. The method of claim 12, and further comprising updating said user profile information associated with said user in response to content selections made by said user.

14. The method of claim 1, and further comprising providing a response as an alternative to providing access to said protected media segment in the absence of said accessing of said gating media segment.

15. The method of claim 14, wherein said protected media segment comprises an encoded portion of a presentation comprising audio and video components, and wherein said alternative comprises enabling a rendering of said audio component while inhibiting a rendering of said video component.

16. The method of claim 14, wherein said alternative comprises enabling a rendering of a teaser presentation associated with said protected media segment.

17. The method of claim 1, and further comprising providing a rendering application to reside on a media device.

18. A method comprising:
providing a plurality of protected segments from a contiguous media content segment, wherein a plurality of gating media segments are sequentially interleaved among said plurality of protected segments according to a timeline profile; and
inhibiting a user from accessing each one of said protected segments in the absence of an access of each associated one of said plurality of gating media segments interleaved to be positioned preceding to its associated one of said protected media segments according to said timeline profile, wherein one or more of said plurality of gating media segments, when accessed, result in display of links to at least one website operated by one or more sponsors; and determining a fee based, at least in part, on selection of said displayed links.

19. The method of claim 18, wherein said contiguous media content segment comprises an atomic media content segment.

20. The method of claim 18, wherein said access of said gating media segment comprises rendering a presentation based, at least in part, on at least a portion of said gating media segment.

21. The method of claim 18, wherein said gating media segment comprises advertisement.

22. The method of claim 18, wherein said media content comprises an encoded audio and/or video presentation.

23. The method of claim 18, wherein said media content segment comprises interactive media content.

24. The method of claim 18, and further comprising: providing an agent to reside on a computing platform associated with said user; and transmitting said protected segments to said agent.

25. The method of claim 24, and wherein said transmitting said protected segments to said agent further comprises transmitting said at least one protected segment in response to detecting a rendering of a presentation based, at least in part, on said gating media segment.

26. The method of claim 18, and further comprising associating gating media segments with said protected segments.

27. The method of claim 18, and further comprising: maintaining a database of user profile information associated with said user; and providing at least one gating media segment associated with said plurality of protected segments based, at least in part, on said user profile information.

28. The method of claim 27, and further comprising updating said user profile information in response to purchasing behavior associated with said user.

29. An apparatus computing:
a computing platform, said computing platform being adapted to:
receive a plurality of protected segments selected from a contiguous media content segment;
receive a plurality of gating media segments sequentially interleaved among said plurality of protected segments according to a timeline profile;
provide a user access to each one of said protected segments in response to an access of each associated one of said plurality of gating media segments interleaved to be positioned preceding to its associated one of said protected segments according to said timeline profile, wherein one or more of said plurality of gating media segments, when accessed, result in display of links to at least one website operated by one or more sponsors; and
determine a fee based, at least in part, on selection of said displayed links.

30. The apparatus of claim 29, wherein said contiguous media content segment comprises an atomic media content segment.

31. The apparatus of claim 29, wherein said access of a gating media segment associated with said protected segment comprises rendering a presentation based, at least in part, on said gating media segment.

32. The apparatus of claim 29, wherein said computing platform comprises a communication adapter to receive said plurality of protected segments according to an Internet Protocol.

33. The apparatus of claim 32, wherein said computing platform is further adapted to store said protected segments in a memory.

34. The apparatus of claim 32, wherein said computing platform is further adapted to transmit a message through said communication adapter in response to said access of said gating media segment.

35. The apparatus of claim 34, wherein said computing platform is further adapted to receive said one of said protected media segments from said communication adapter following transmission of said message.

36. A system to provide media content to a media device, the system comprising:
a first service to transmit media content to said media device over a data transmission network, said media content comprising a plurality of protected segments selected from a contiguous media content segment, wherein a plurality of gating media segments are sequentially interleaved among said plurality of protected segments according to a timeline profile; and
a second service provide access to each one of said protected segments at said media device in response to access at said media device to each associated one of said plurality of gating media segments interleaved to be positioned preceding to its associated one of said protected segments according to said timeline profile, wherein one or more of said plurality of gating media segments, when accessed, result in display of links on said media device to at least one website operated by one or more sponsors; and determine a fee based, at least in part, on selection of said displayed links.

37. The system of claim 36, wherein said contiguous media content segment comprises an atomic media content segment.

38. The system of claim 36, wherein said second service comprises a computing platform adapted to transmit machine-readable instructions to said media device to enable said media device to host a rendering application.

39. The system of claim of claim 38, wherein said rendering application is adapted to enable streaming of a protected segment from said first service to said media device in response to detecting access of a gating media segment associated with said streamed protected segment.

40. The system of claim 39, wherein said second service is further adapted to transmit a timeline profile to said media device comprising metadata associated with said protected segments and said gating media segments.

41. The system of claim 40, wherein said system further comprises a third service to provide gating media segments to said rendering application in response to receipt of said metadata associated with said gating media segments.

42. The system of claim 41, wherein said third service comprises a computing platform adapted to determine said gating media segments based, at least in part, on a user profile associated with a user.

43. The system of claim 42, wherein said computing platform is further adapted to determine said user profile based, at least in part, on a history of purchasing behavior associated with said user.

44. The system of claim 42, wherein said computing platform is further adapted to determine said user profile based, at least in part, on a history of content selections associated with said user.

45. The system of claim 41, wherein said third service comprises a computing platform adapted to determine said gating media segments based, at least in part, on a geographic location of said media device.

46. The system of claim 41, wherein said third service comprises a computing platform to determine said gating media segments based, at least in part, on a time of clay.

47. The system of claim 41, wherein said third service comprises a computing platform to determine said gating media segments based, at least in part, on a day of week.

48. The system of claim 41, wherein said third service comprises a computing platform to determine said gating media segments based, at least in part, on a calendar date.

49. The system of claim 41, wherein said gating media segments comprise advertising content, and wherein said access at said media device to associated gating media segments comprises rendering a presentation at said media device based, at least in part, on said advertising content.

50. A method comprising:
receiving a selection of a contiguous media content segment from a media device, including a plurality of protected segments and a plurality of gating media segments, wherein said plurality of gating media segments are sequentially interleaved among said plurality of protected segments according to a timeline profile;
selectively providing access to each one of said plurality of protected segments selected from said contiguous media content segment at said media device in response to access to each associated one of said plurality of gating media segments from said media device interleaved to be positioned preceding to its associated one of said protected segments according to said timeline profile, wherein one or more of said gating media segments, when accessed at said media device, result in display of links on said media device to at least one website operated by at least one of said one or more sponsors
determining a fee based, at least in part, on selection of said displayed links; and
receiving said fee from one or more sponsors associated with said gating media segments.

51. The method of claim 50, and further comprising determining said fee based, at least in part, on specific ones of said gating media segments which are accessed at said media device.

52. The method of claim 50, and further comprising providing a rendering application to reside on said media device.

53. The method of claim 52, wherein said method further comprises transmitting a timeline profile to said media associated with said content selection, said timeline profile comprising metadata associated with said plurality of gating media segments and said plurality of protected segments.

54. The method of claim 53, wherein said metadata comprises links addresses associated with said protected segments.

55. The method of claim 53, wherein said metadata comprises information associated with durations associated with said gating media segments.

56. The method of claim 50, and further comprising streaming at least one protected segment to said media device in response to detection of a rendering of a presentation based, at least in part, on a gating media segment associated with said at least one protected segment.

57. The method of claim 50, and further comprising: receiving a subscription fee from a premium class of subscriber users; and enabling said premium class of user subscribers to access protected segments of media content selections without accessing at least some of said associated gating media segments.

58. The method of claim 50, and further comprising determining said gating media segments based, at least in part, on a user profile associated with a user.

59. The method of claim 58, and further comprising determining said user profile based, at least in part, on purchasing behavior associated with said user.

60. The method of claim 58, and further comprising determining said user profile based, at least in part, on media content selections associated with said user.

61. The method of claim 50, wherein said contiguous media content segment comprises an atomic media content segment.

62. A method comprising:
receiving a selection of media content from a media device;
identifying a plurality of protected segments associated with said selection;
identifying a plurality of gating media segments associated with said protected segments, wherein said plurality of gating media segments are sequentially interleaved among said plurality of protected segments according to a timeline profile;
selectively enabling access to each one of said plurality of protected segments at said media device in response to access to each associated one of said plurality gating media segments from said media device interleaved to be positioned preceding to its associated one of said protected segments according to said timeline profile, wherein one or more of said gating media segments, when accessed at said media device, result in display of links on said media device to at least one website operated by at least one of said one or more sponsors;
determining a fee based, at least in part, on selection of said displayed links; and
receiving said fee from one or more sponsors associated with said plurality of gating media segments.

63. The method of claim 62, wherein said plurality of protected segments are selected from an atomic and contiguous media content segment.

64. The method of claim 62, and further comprising transmitting metadata associated with said gating media segments to said media device.

65. The method of claim 62, wherein said and further comprising paying an owner of a copyright of said selected media content.

66. The method of claim 62, and further comprising transmitting metadata associated with said protected segments to said media device.

67. The method of claim 64, wherein said metadata associated with said protected segment comprises information associated with a location of said protected segments.

68. The method of claim 64, wherein said metadata associated with said protected segments comprises one or more URLs.

69. The method of claim 62, and further comprising determining said fee based, at least in part, on specific ones of said gating media segments which are accessed at said media device.

70. A method comprising:
receiving a selection of a contiguous media content segment from a media device;
selectively providing access to a plurality of protected segments selected from said contiguous media content segment at said media device in response to access of associated gating media segments from said media device; and receiving a fee from one or more sponsors associated with said gating media segments;

wherein one or more of said gating media segments, when accessed at said media device, result in display of links on said media device to at least one website operated by at least one of said one or more sponsors, and further comprising determining said fee based, at least in part, on selection of said displayed links.

71. A method comprising:

receiving a selection of media content from a media device;

identifying a plurality of protected segments associated with said selection;

identifying a plurality of gating media segments associated with said protected segments;

selectively enabling access to said plurality of protected segments at said media device in response to access of associated gating media segments from said media device; and receiving a fee from one or more sponsors associated with said gating media segments;

wherein one or more of said gating media segments, when accessed at said media device, result in display of links on said media device to at least one website operated by at least one of said one or more sponsors, and further comprising determining said fee based, at least in part, on selection of said displayed links.

* * * * *

UNITED STATES PATENT AND TRADEMARK OFFICE
CERTIFICATE OF CORRECTION

PATENT NO.        : 8,438,646 B2
APPLICATION NO.   : 11/413274
DATED             : May 7, 2013
INVENTOR(S)       : Ariff Sidi Page 1 of 1

It is certified that error appears in the above-identified patent and that said Letters Patent is hereby corrected as shown below:

In the Claims

Column 25, line 7, "clay" should be changed to --day--.

Column 25, line 14, "claim 41" should be changed to --claim 37--.

Signed and Sealed this
First Day of April, 2014

Michelle K. Lee
*Deputy Director of the United States Patent and Trademark Office*